United States Patent
Pöppel et al.

(10) Patent No.: US 10,483,052 B2
(45) Date of Patent: Nov. 19, 2019

(54) METHOD FOR CLEANING ELECTRICAL CONTACTS OF AN ELECTRICAL SWITCHING DEVICE AND MOTOR VEHICLE

(71) Applicant: AUDI AG, Ingolstadt (DE)

(72) Inventors: Armin Pöppel, Gaimersheim (DE); Stefan Dünsbier, Regensburg (DE)

(73) Assignee: AUDI AG, Ingolstadt (DE)

( * ) Notice: Subject to any disclaimer, the term of this patent is extended or adjusted under 35 U.S.C. 154(b) by 345 days.

(21) Appl. No.: 15/377,400

(22) Filed: Dec. 13, 2016

(65) Prior Publication Data
US 2017/0186563 A1    Jun. 29, 2017

(30) Foreign Application Priority Data

Dec. 24, 2015    (DE) ................. 10 2015 016 992

(51) Int. Cl.
*H01H 1/60* (2006.01)
*B60R 16/03* (2006.01)
*H01H 47/00* (2006.01)

(52) U.S. Cl.
CPC .............. *H01H 1/60* (2013.01); *B60R 16/03* (2013.01); *H01H 1/605* (2013.01); *H01H 47/002* (2013.01); *H01H 2047/003* (2013.01)

(58) Field of Classification Search
CPC ........ H01H 1/60; H01H 47/002; H01H 1/605; H01H 2047/003; B60R 16/03
See application file for complete search history.

(56) References Cited

U.S. PATENT DOCUMENTS

| | | | |
|---|---|---|---|
| 4,617,604 A | 10/1986 | Narimatsu et al. | |
| 7,362,011 B2 | 4/2008 | Komatsu et al. | |
| 8,975,774 B2 | 3/2015 | Kreutzer et al. | |
| 9,490,509 B2 | 11/2016 | Achhammer et al. | |
| 2005/0014421 A1* | 1/2005 | Sweetland | H01R 4/58 439/775 |

(Continued)

FOREIGN PATENT DOCUMENTS

| | | |
|---|---|---|
| CN | 1694199 A | 11/2005 |
| CN | 101231920 A | 7/2008 |
| CN | 102906846 A | 1/2013 |

(Continued)

OTHER PUBLICATIONS

European Search Report dated Apr. 21, 2017 with respect to counterpart Chinese patent application EP 16 19 8198.

(Continued)

*Primary Examiner* — Rexford N Barnie
*Assistant Examiner* — Terrence R Willoughby
(74) *Attorney, Agent, or Firm* — Henry M. Feiereisen LLC

(57) ABSTRACT

A method for cleaning electrical contacts of an electrical switching device includes displacing a first electrical contact element and a second electrical contact element of an electrical contact relative to each other so that the first electrical contact element and the second electrical contact element are in a closed position; and when the first and second electrical contact elements are in the closed position applying a waveform on the electrical contact so that the first contact element and the second contact element are excited to undergo a mechanical vibration relative to each other.

13 Claims, 1 Drawing Sheet

(56) References Cited

U.S. PATENT DOCUMENTS

2014/0039693 A1* 2/2014 Havens ................ H01R 43/002
　　　　　　　　　　　　　　　　　　　　　　　　700/280

FOREIGN PATENT DOCUMENTS

| DE | 322 86 86 A1 | 2/1984 |
| DE | 195 45 254 A1 | 9/2000 |
| DE | 10 2011 115 707 A1 | 9/2012 |
| DE | 10 2012 207 592 A1 | 11/2013 |
| DE | 10 2012 011 251 | 12/2013 |
| DE | 10 2012 222 129 | 6/2014 |
| WO | WO 96/30917 A1 | 10/1996 |

OTHER PUBLICATIONS

Translation of European Search Report dated Apr. 21, 2017 with respect to counterpart Chinese patent application EP 16 19 8198.
Chinese Search Report dated Apr. 28, 2018 with respect to counterpart Chinese patent application No. 2016112132231.
Translation of Chinese Search Report dated Apr. 28, 2018 with respect to counterpart Chinese patent application No. 2016112132231.

* cited by examiner

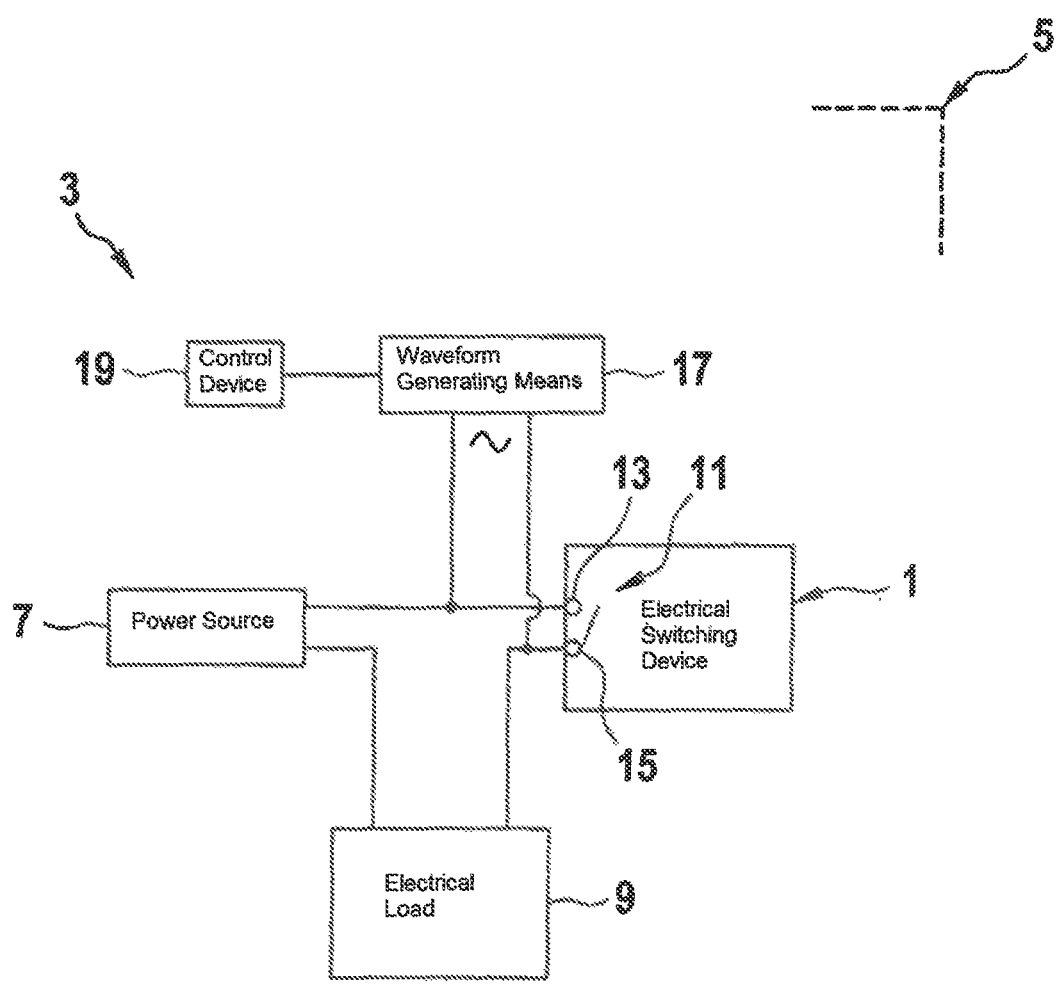

METHOD FOR CLEANING ELECTRICAL CONTACTS OF AN ELECTRICAL SWITCHING DEVICE AND MOTOR VEHICLE

CROSS-REFERENCES TO RELATED APPLICATIONS

This application claims the priority of German Patent Application, Serial No. 10 2015 016 992.0, filed Dec. 24, 2015, pursuant to 35 U.S.C. 119(a)-(d), the content of which is incorporated herein by reference in its entirety as if fully set forth herein.

BACKGROUND OF THE INVENTION

The invention relates to a method for cleaning electrical contacts of an electrical switching device.

The following discussion of related art is provided to assist the reader in understanding the advantages of the invention, and is not to be construed as an admission that this related art is prior art to this invention.

In particular electrical contacts that are configured as power contacts and contactors are subject to age related wear depending on different factors for example temperature, switching currents, carrier currents, switching times, mechanical vibrations and other factors. After a certain aging and a certain number of switching cycles of the electrical contacts over their lifetime this wear leads to a failure of the electrical switching device due to contaminated and/or burned out contacts. Different measures are known to avoid or to remove contaminations and corrosion points on electrical contacts.

For example from U.S. Pat. No. 4,617,604 A a method is known in which an electrical switching device with a plurality of electrical contacts is partially switched in the currentless state—in order to protect the contacts—and is partially switched in the current applied state—in order to clean the contacts. Hereby the switching in the currentless state increases the service life of the electrical switching device but also leads to buildup of contaminations and/or oxide films. During switching in the current applied state these may be partially removed or reduced, which however—in particular as a result of the formation of electric arcs or arc discharges—leads to a shortened service life of the switching device.

It would be desirable and advantageous to provide a method for cleaning electrical contacts of an electrical switching device and a vehicle having such an electrical switching device, wherein the cleaning of the electrical contacts is performed in an alternative and preferably improved manner.

SUMMARY OF THE INVENTION

According to one aspect of the present invention a method for cleaning electrical contacts of an electrical switching device includes displacing a first electrical contact element and a second electrical contact element of an electrical contact relative to each other so that the first electrical contact element and the second electrical contact element are in a closed position; and when the first and second electrical contact elements are in the closed position applying a waveform on the electrical contact so that the first contact element and the second contact element are excited to undergo a mechanical vibration relative to each other. Due to the excitation of mechanical vibrations or vibrations of the contact elements relative to each other the contact elements grind on or against each other in the closed position, resulting in a mechanical cleaning effect. The contacts hereby perform a self-cleaning, which attenuates or reverses the wear, in particular caused by contamination and/or corrosion, for the electrical contact elements and with this the electrical contact overall. The mechanical cleaning on one hand is very efficient and on the other and also very gentle, in particular because the contact elements remain closed during this process and thus no sparks or electric arc discharges have to be feared and because they are not subjected to a high burn-off current.

The term electrical contact in this context means in particular a switchable electrical connection, which has a first contact element and a second contact element, which on one hand can be displaced into an open position in which the electrical contact is open, and into a closed position in which the electrical contact is closed. Thus the electrical contact can be opened and closed by displacing the first contact element and the second contact element relative to each other. It is possible that only one of the contact elements is actually displaced while the other contact element remains stationary. However, it is also possible that both contact elements are displaced.

The term electrical switching device means a device, which has at least one electrical contact, wherein the switching device is configured to switch the at least one electrical contact. Preferably the electrical switching device has a plurality of electrical contacts and is configured to switch the plurality of electrical contacts—preferably independent of each other.

The electrical switching device is preferably configured as a power switch device and is thus configured to switch electrical power connections—as opposed to a switching device, which is only configured to switch control voltages or control currents.

The term contact element means an element, which is suited and/or configured to interact with a further contact element in order to establish or separate an electrical contact. The contact element is in particular configured electrically conductive.

The term open position in particular means a relative position of the contact elements in which the contact elements are arranged spaced apart from each other so that the electrical contact is open. The term closed position means a position of the contact elements relative to each other in which the contact element are arranged relative to each other so that the electrical contact is closed. In particular the contract elements are in mechanical contact with each other in the closed position, i.e., they contact each other so that an electrical current or an electrical signal can be transmitted via the contact elements.

The fact that the contact elements can be arranged in the open position and in the closed position means in particular that the contact elements are spaced apart from each other or are in mechanical contact with each other.

The term electrical waveform means an electrical signal, in particular a current or a voltage, which can be temporally changed, in particular which is temporally changed. This can for example be an alternating—in particular sinusoid—voltage, a triangular signal, a rectangular signal or another appropriate waveform. Particularly preferably an alternating current is used as electrical waveform wherein the alternating current can be sinusoid but may also have another shape for example the shape of a triangular or rectangular signal.

It is possible that the electrical waveform has vibration pulses, which excite the contact elements to mechanical vibrations.

The term mechanical vibrations means in particular movements of the contact elements relative to each other, wherein it is possible that only one of the contact elements is actually moved while the other one remains stationary. The vibration forms of the mechanical vibrations are hereby preferably situated in a plane, with a direction in which the electrical current flows from one of the contact elements to the other contact element being perpendicular to this plane. The contact elements thus grind transversely on each other due to the mechanical vibration which avoids that the contact elements briefly open and close again due to the vibration. Rather the contact elements remain in the closed state and in contact with each other also during the vibrations. As a result of the transversely extending vibrations the contact elements self clean fast and effectively. The targeted transverse vibration movements of the contact elements cause a self-cleaning of the contact elements and attenuate or reverse the wear.

According to another advantageous feature of the invention, during the operation of the switching device the electrical waveform is superimposed over an electrical current, in particular an operational current. Hereby thus an electrical current flows over the closed contact elements, i.e., over the electrical contact onto which the electrical waveform is superimposed. Because the contact elements do not lift off from each other as a result of the vibration but remain in the closed position the cleaning can be performed during operation of the switching device and in particular in the current-conducting state of the switching device in the closed position. Hereby the transverse vibration of the contact elements on each other in the current conducting state does not lead to any increased wear because the formation of sparks or arc discharge phenomena is avoided.

According to another advantageous feature of the invention, the electrical waveform is superimposed over a direct current during operation. According to another embodiment of the invention the electrical waveform is superimposed over an alternating current during operation of the switching device, wherein in this case the frequency of the electrical waveform is preferably different from the frequency of the alternating current, wherein particular preferably the frequency of the electrical waveform is greater than the frequency of the alternating current.

According to another advantageous feature of the invention, the electrical waveform is generated with at least one frequency, which is suited to generate mechanical vibrations at a natural frequency of the electrical contact. The at least one frequency of the electrical waveform is thus preferably close to the resonance or natural frequency of the electrical contact, whereby the latter can be excited to mechanical vibrations very effectively. The resonance frequency of the electrical contact is hereby defined in particular by the masses of the contact elements that are involved in the mechanical vibrations.

It is possible that the electrical waveform is generated with exactly one frequency, i.e., frequency purity. As an alternative it is also possible that the electrical waveform is generated with a frequency band or has a superimposition of a plurality of different frequencies. Hereby at least one frequency lies preferably in the range of the natural frequency of the electrical contact so that the electrical contact is efficiently excited to mechanical vibrations. The frequency band lies preferably also close to the natural frequency of the electrical contact, wherein the frequency band preferably includes the natural frequency. It is in particular possible that the frequency band is centered around the natural frequency of the electrical contact.

The at least one frequency of the electrical waveform is preferably generated in the range if multiple kHz. Thus a high-frequency excitation frequency in the resonance frequency range of the electrical contact is applied to the electrical contact, whereby the electrical contact is efficiently excited to high-frequency movements, in particular to mechanical vibrations in the kHz range.

According to another advantageous feature of the invention, the electrical waveform is generated with a frequency that corresponds to the natural frequency or multiples of the natural frequency of the electrical contact. Hereby a particularly efficient excitation of the contact elements to undergo mechanical vibrations can occur. The term multiples of the natural frequency in this context means integer multiples, i.e., overtones or over-vibrations of the natural frequency of the electrical contact.

According to another advantageous feature of the invention, the natural frequency of the electrical contact is determined by application of white noise to the electrical contact. In this way the resonance frequency or natural frequency can be determined very easily and quickly, in particular in that the damping behavior of the electrical contact for the frequency contained in the white noise is analyzed. The natural frequency is thus preferably determined prior to cleaning the electrical contacts. Hereby it is possible that this analysis is performed once, wherein subsequently a frequency, a superimposition of frequencies or a frequency band for the electrical waveform for the cleaning is determined and retained. However it is also possible that the natural frequency is newly determined multiple times, in particular in predetermined intervals or as needed, which has the advantage that the excitation by the electrical waveform can be adjusted in particular to age-related changes of the contact elements for example caused by mass loss due to the mechanical abrasion. Also in this case however the application of white noise to the electrical contact is used at least not primarily for the purpose of cleaning but rather for respectively determining the natural frequency anew.

According to another advantageous feature of the invention, the electrical switching device is configured as a contactor. Hereby the term contactor, which is also referred to a switch contactor, in particular means an electrically or pneumatically actuatable switch for electrical lines, in particular for large electrical lines. Preferably a contactor has two switching positions and switches preferably monostable. As an alternative it is possible that the electrical switching device is configured as a relay. A relay is hereby typically configured as a contactor for low switching powers.

The method thus in particular involves cleaning of electrical contacts of an electrical switching device that are configured as a contactor or as a relay.

According to another advantageous feature of the invention, electrical contacts of an electrical switching device are cleaned that is configured as an electrical switching device for a motor vehicle. By means of the method the reliability and service life of the onboard electronics of a motor vehicle can advantageously be improved.

According to another advantageous feature of the invention, at least one electrical contact is cleaned which has contact elements, which have a geometrical shape in a contact region that causes a point contact or a line contact between the contact elements in the closed position. This in particular means that at least one of the contact elements is shaped in the contact region so that a point or line contact of the contact elements is realized in the closed position. For example it is possible that at least one of the contact elements is shaped convexly in the contact region. The other one of the contact elements can then for example be flat or can also be shaped convexly. In this case the contact elements contact each other in the contact region in the closed position preferably only via a point contact or line contact. This has the advantage that in the direct vicinity of the puncitform or linear region an electrical current has to flow radially inwards in one of the contact elements and in the other contact element radially outwards in order to reach the contact point or the contact line or to move away from the same. The contact point or the contact line thus so to speak represents a bottleneck for the electrical current. Hereby electrical currents form in the contact elements that are directed in opposite directions and generate magnetic fields which repel each other. These repelling forces are temporally changed by the temporal variation of the electrical waveform, in particular periodically. This results in a very efficient mechanical movement of the contact elements relative to each other.

According to another advantageous feature of the invention, at least one of the contact elements, selected from the first contact element and the second contact element is movably supported in the closed position, particularly preferably the at least one contact element is elastically supported. It can therefore at least slightly move, in particular in the case of a temporal variation of the repelling forces between the contact elements, which aids in establishing mechanical movements of the contact elements relative to each other. Particularly preferably the at least one contact element is hereby pivotally supported so that it can pivot back and forth relative to the other contact element. In this way a pivoting transverse movement can be generated in the closed position, wherein the contact elements grind against each other, without the contact being opened.

According to another aspect of the invention, a motor vehicle, includes an electrical switching device, wherein the electrical switching device includes an electrical contact, the electrical contact having a first electrical contact element and a second electrical contact element, wherein the first and second electrical contact element are displaceable relative to each other between an open position and a closed position; and a control device configured to apply a waveform on the electrical contact when the when the first and second electrical contact elements are in the closed position so that the first contact element and the second contact element are excited to undergo a mechanical vibration relative to each other. The control device is preferably configured to superimpose the electrical waveform during operation of the switching device on an electrical current. In connection with the motor vehicle in particular the advantages discussed in connection with the method result.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic representation of an electrical switching device.

DETAILED DESCRIPTION OF PREFERRED EMBODIMENTS

Throughout all the FIGURES, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The FIGURE shows a schematic representation of an electrical switching device 1, which in the present case is arranged in a higher order electrical device 3, for example an onboard electronics of the motor vehicle 5. The electrical switching device 1 hereby serves in particular for switching electrical power and is particularly preferably configured as a contactor or as a relay.

The electrical switching device 1 is electrically connected with an electrical power source 7, which is preferably configured as a direct voltage source or as a direct current source, and is configured to connect an electrical load 9 or sink, in particular a user, with the electrical power source 7 in a first switching position and to disconnect these components from the power source 7 in a second switching position.

For this purpose the electrical switching device 1 has at least one electrical contact 11, which has a first contact element 13 and a second contact element 15. These are displaceable relative to each other into an open position and into a closed position so that the electrical contact 11 can be opened and closed. Hereby the open position of the contact elements 13, 15 corresponds to a switching position of the electrical switching device 1 in which the electrical load 9 is separated from the power source 7, wherein the closed position of the contact elements 13, 15 corresponds to a switching position of the electrical switching device 1 in which the electrical load 9 is electrically connected with the electrical power source 7.

A waveform generating means 17 is provided, which is preferably configured as an alternating current source and which is operatively connected with the contact elements 13, 15 so that an electrical waveform, in particular an alternating voltage, can be applied to the contact elements so that the contact elements 13, 15 are excited for mechanical vibration relative to each other.

Further a control device 19 is provided which is configured to control the waveform generating means 17 so that the waveform generating means—in particular in predetermined time intervals—as need or otherwise can generate an electrical waveform which can be applied to the contact elements 13, 15 for exciting the contact elements to undergo mechanical movements relative to each other.

The waveform generating means 17 is in particular electrically connected with the electrical switching device 1 so that the electrical waveform, which is generated by the waveform generating means 17, is superimposed during operation of the switching device 1 with an electrical current generated by the electrical power source 7.

The electrical waveform is preferably generated by the waveform generating means 17 with at least one frequency, which is suited to generate mechanical vibrations at a natural frequency of the electrical contact 11. Particularly preferably the electrical waveform is hereby generated with a frequency, which corresponds to the natural frequency or a multiple of the natural frequency of the electrical contact 11. It is possible that this natural frequency is determined once or multiple times by applying white noise by means of the waveform generating means 17 on the electrical contact 11.

Excitation of the electrical contact elements 13, 15 to undergo mechanical vibrations relative to each other in particular causes the contact elements to undergo higher frequency transverse vibrations, in particular in the kHz range, whereby the contact elements—without leaving the closed position—are quickly and effectively cleaned.

The contact elements 13, 15 in particular have a geometrical shape in a contact region, which causes a point contact or a line contact of the contact elements 13, 15 in the closed position. Hereby it is in particular possible that at least one of the contact elements 13, 15 is configured convex in the contact region. It is further possible that at least one of the contact elements 13, 15 is supported movable, in particular elastically, in the closed position.

Overall it can be see that the method and the motor vehicle allow a very efficient and at the same time gentle cleaning, in particular of power contacts of an electrical switching device so that ageing-related wear can be attenuated or even reversed without the cleaning having an adverse effect on the service life of the electrical switching device.

Hereby in particular a self-cleaning of the electrical contact is performed based on an electromagnetic repulsion.

What is claimed as new and desired to be protected by Letters Patent is set forth in the appended claims and includes equivalents of the elements recited therein:

What is claimed is:

1. A method for cleaning electrical contacts of an electrical switching device, said method comprising:
    displacing a first electrical contact element and a second electrical contact element of an electrical contact relative to each other so that the first electrical contact element and the second electrical contact element are in a closed position; and
    when the first and second electrical contact elements are in the closed position, applying an electrical waveform using a control device so that the first contact element and the second contact element are excited to undergo a mechanical vibration relative to each other without leaving the closed position.

2. The method of claim 1, wherein during operation of the electrical switching device, the electrical waveform is superimposed on an electrical current.

3. The method of claim 2, wherein the electrical current is an operating current.

4. The method of claim 1, wherein the electrical waveform is generated with at least one frequency, which is suited to generate mechanical vibrations at a natural frequency of the electrical contact.

5. The method of claim 1, wherein the electrical waveform is generated with a frequency, which corresponds to a multiple of the natural frequency of the electrical contact.

6. The method of claim 1, wherein the natural frequency is determined by applying white noise on the electrical contact.

7. The method of claim 1, wherein the electrical switching device is configured as a contactor or as a relay.

8. The method of claim 1, wherein the electrical switching device is configured as a switching device for a motor vehicle.

9. The method of claim 1, wherein the electrical switching device is configured as a switching device for an onboard electronics of a motor vehicle.

10. The method of claim 1, wherein the contact elements of the electrical contact, have a geometric shape in a contact region, which causes a point contact or a line contact of the contact elements in the closed position.

11. The method of claim 1, wherein at least one of the first and second contact elements is supported for movement in the closed position.

12. The method of claim 1, wherein at least one of the first and second contact elements is supported elastically in the closed position.

13. A motor vehicle, comprising:
    an electrical switching device, said electrical switching device including an electrical contact, said electrical contact having a first electrical contact element and a second electrical contact element, said first and second electrical contact element being displaceable relative to each other between an open position and a closed position; and
    a control device configured to apply an electrical waveform on the electrical contact when the when the first and second electrical contact elements are in the closed position so that the first contact element and the second contact element are excited to undergo a mechanical vibration relative to each other without leaving the closed position.

* * * * *